United States Patent Office 2,873,554
Patented Feb. 17, 1959

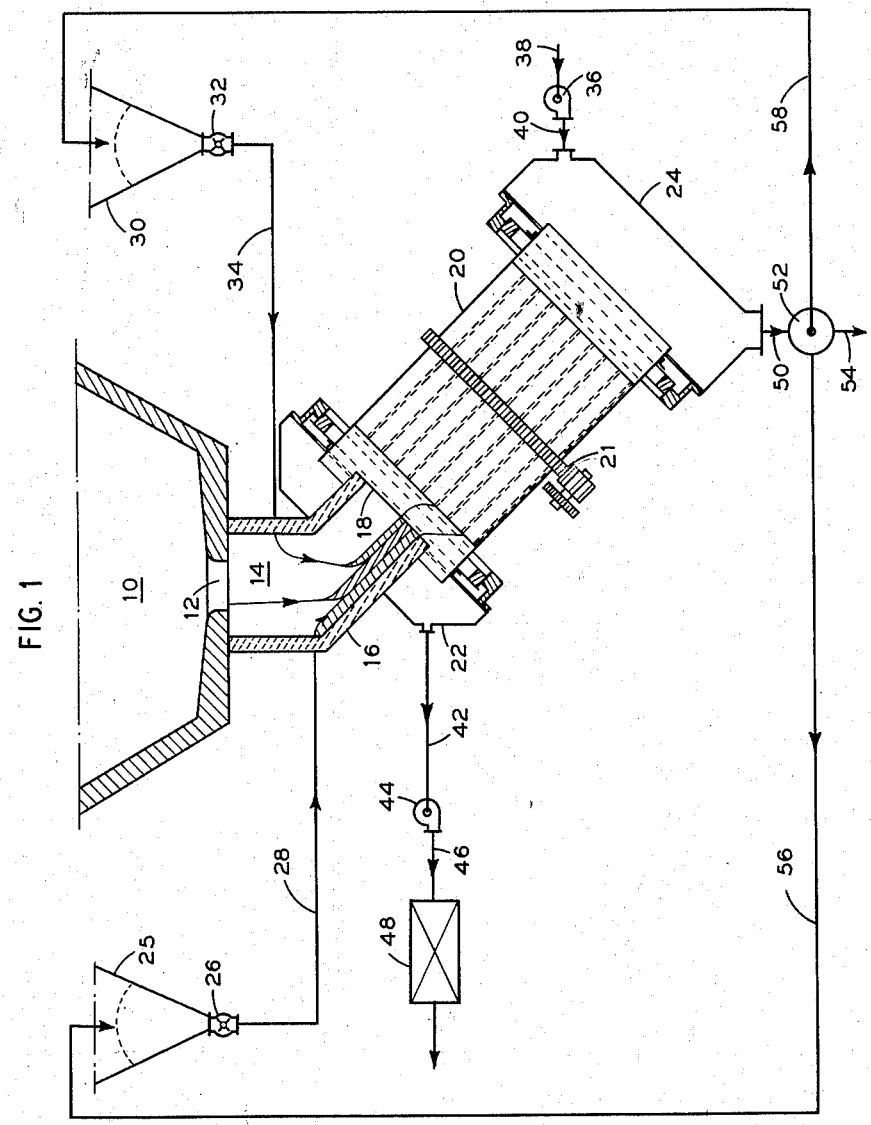

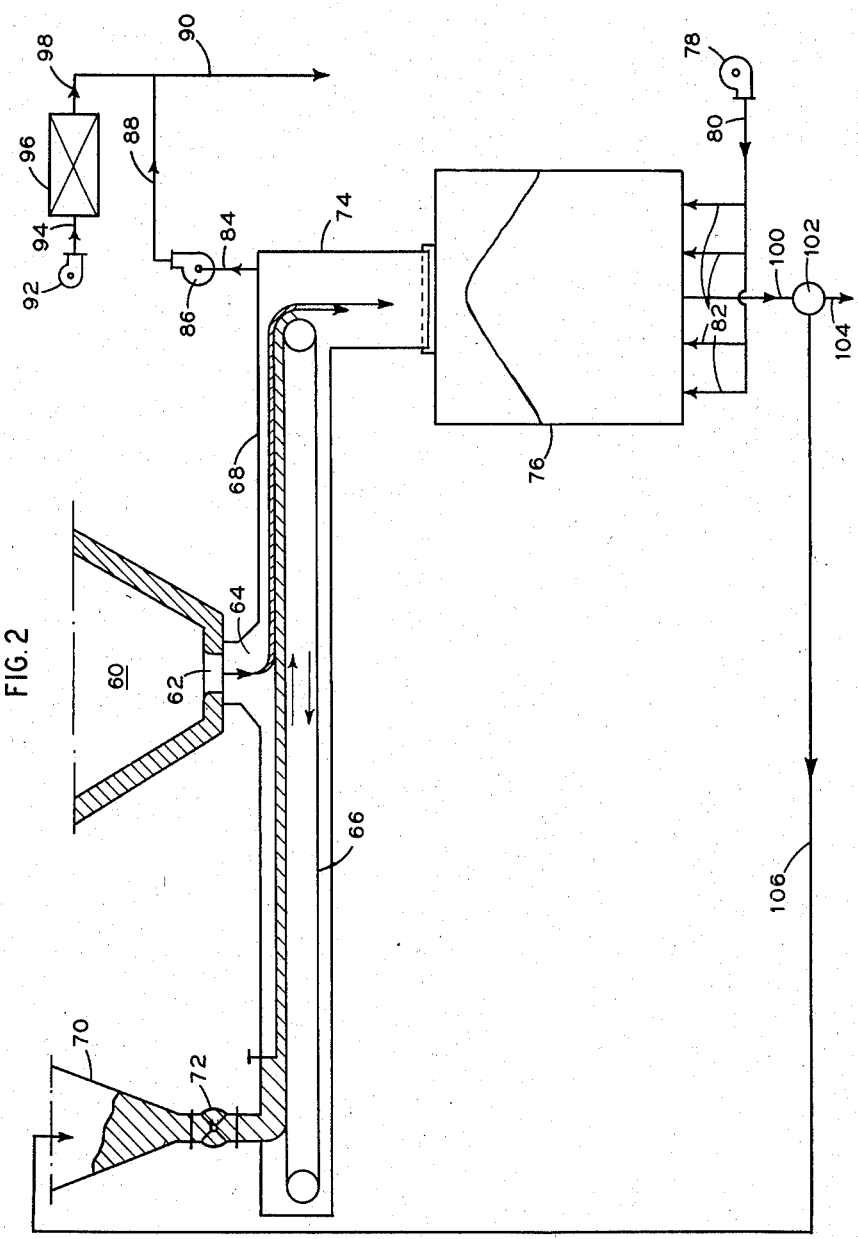

2,873,554

APPARATUS FOR AND A METHOD OF RECOVERING HEAT FROM MOLTEN SLAG

Andreas Sifrin and Hermann Hennecke, Oberhausen, Rhineland, Germany, assignors to The Babcock & Wilcox Company, New York, N. Y., a corporation of New Jersey Application May 15, 1956, Serial No. 584,916

14 Claims. (Cl. 49—1)

This invention relates to apparatus for and a method of recovering heat from molten slag and more particularly to apparatus for and a method of reclaiming the heat inherent in molten slag discharged from a furnace, such as a furnace fired by a slag-forming solid fuel or a metallurgical furnace, by utilizing it for preheating the combustion air delivered to the furnace.

The molten slag discharged from a furnace of the character described contains considerable usable heat, especially where the ash content of the fuel is relatively high. In accordance with the present invention, heat is recovered from a stream of molten slag by first introducing the stream of molten slag into direct heat transfer relation with a stream of granulated slag so that the molten slag gives up a substantial portion of its latent heat of fusion to the granulated slag. The resulting slag mass is then caused to break and granulate while air is passed in direct heat transfer and relation therewith to absorb a substantial portion of the heat content of the slag, thereby producing a descending temperature gradient in the slag and an ascending temperature gradient in the air. Recovery in this manner of the heat of molten slag discharging from a furnace results in more efficient and economical furnace operation.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention is illustrated and described.

Of the drawings:

Fig. 1 is a diagrammatic sectional elevation of a portion of a slag-forming solid fuel fired fluid heating unit embodying our invention; and Fig. 2 is a diagrammatic sectional elevation of a modification of the arrangement of Fig. 1.

Referring to the embodiment shown in Fig. 1, molten slag from a combustion chamber or furnace 10 of a slag forming solid fuel fired fluid heating unit discharges continuously through a slag outlet 12 into one end of a chamber 14 defined by refractory walls including an inclined floor section 16 and having an outlet 18 at its opposite end opening to a drum or chamber 20 of a rotating kiln type. The drum 20 is arranged concentrically about the discharge outlet 18 of the chamber 14 and with its longitudinal axis at an inclination. The drum 20 is driven by suitable means including gears 21, and rotates within an air discharge housing 22 at one end and a slag discharge housing or collecting chamber 24 at its opposite end, both housings being provided with suitable sealing means adjacent the drum to prevent flow of gaseous fluid therebetween.

A stream of recirculated granulated slag is introduced onto the upper portion of the floor 16 of the chamber 14 from a hopper 25 by way of suitable feeding equipment, which includes in this case a regulable feeder 26 operating in conjunction with a vibratory feeder, indicated by the connecting line 28. The floor 16 has an inclination sufficient to insure that the slag will gravitate into the drum 20. The molten slag discharging continuously from the furnace 10 through the outlet 12 flows onto the upper surface and into the interstitial spaces of the moving layer of granulated slag discharged onto the floor 16 by the vibratory feeder 28. Recirculated granulated slag is also fed into the chamber 14 from a second hopper 30 by way of suitable feeder equipment, such as a regulable feeder 32 and a vibratory feeder indicated by the connecting line 34 in Fig. 1. This slag discharges on top of and substantially covers the layer of molten slag. The molten slag, being sticky in nature, adheres to and branches into the interstitial spaces of the granulated slag. As the slags are mixed, the molten slag gives up a substantial portion of its latent heat of fusion, thus partially solidifying the molten slag in very thin layers which break easily when the slag mass is agitated. The latent heat of fusion of the molten slag is much less than its sensible heat content below the fusion temperature. For this reason it is necessary to transform the molten slag into the solid state in order to utilize this relatively large sensible heat content.

The mass of slag thus formed gravitates into the drum 20 and as the drum rotates the slag passes downwardly therethrough toward the discharge end. Air is supplied to the slag discharge housing 24 by a fan 36 receiving a supply of air at room temperature through a conduit 38 and discharging through a conduit 40 into the housing 24. As the slag passes through the drum, this air flows upwardly through the drum in countercurrent and direct heat transfer relation with the slag thereby substantially completing solidification of the molten slag and absorbing a substantial proportion of the sensible heat content of the slag. This results in an ascending temperature gradient in the upwardly flowing air stream and a descending temperature gradient in the downwardly moving slag. As the slag moves through the drum 20 it is agitated and tumbled, thereby breaking the slag into smaller pieces and/or particles and exposing additional surfaces to the air stream. In this way, an appreciable portion of the heat content of the slag is recovered.

The air thus preheated flows into the housing 22 and is withdrawn therefrom through a conduit 42 by a blower 44. The air is then forced through a conduit 46 into a heater 48 of the flue gas type for further preheating. This air may serve as combustion air for the firing system of the fluid heating unit.

Because of the tumbling and agitating action within the drum 20, the solidifying slag is broken between the grains of solid slag and discharges in granular form, along with the solid slag, from the drum into the slag discharge housing 24. The slag is then withdrawn from the housing 24 through a conduit 50 by a distributor 52, which can be arranged to perform various tasks according to demand. Its primary purpose is to discharge a portion of the slag to suitable waste receiving means by way of a conduit 54, the amount so discarded depending on the proportion of molten slag being tapped through the outlet 12. The remaining slag is recycled in equal parts through conduits 56 and 58 to the hoppers 25 and 30, respectively, for return to the chamber 14.

All feeder arrangements are constructed and arranged so as to be air-tight. Furthermore, the chamber 14 should operate under a pressure equal to or slightly less than the pressure in the combustion chamber 10 at a location adjacent the outlet 12. The distributor 52 may also be provided with a breaker and/or classifier and a dust collector, in order to assure that the portion of the slag least suitable for recirculation is discarded. If desired, the discarded slag may be used for construction purposes, In the modification shown in Fig. 2, a stream of molten slag from a furnace 60 discharges continuously through an outlet 62 and a vertically arranged conduit 64 onto the upper surface and into the interstitial spaces of a layer or stream of recycled granulated slag moving on a belt 66 enclosed by a casing 68. The granulated slag is supplied to the belt 66 from a hopper 70 by a feeder 72. The belt is arranged to discharge the mass of slag thus formed through a shaft 74 into a slag collecting chamber or pit 76. The slag discharged from the belt breaks up into smaller pieces and/or particles in falling to and upon contact with the pile of slag deposited in the pit 76. Air for preheating is delivered under pressure from a blower 78 through a main conduit 80 and branch conduits 82 into the bottom of the slag pit 76. The air thus introduced flows upwardly through the slag deposited in the pit 76 and in countercurrent heat transfer relation with the slag falling from the belt 66. A substantial portion of the latent heat of fusion of the molten slag is absorbed by the layer of recycled granulated slag before leaving the belt. The ascending air contacting with the descending and deposited slag substantially completes solidification of the molten slag and absorbs a substantial proportion of the sensible heat content of the slag. The distribution of slag over the width of the belt exposes an appreciable portion of the slag surfaces to the air stream as the slag falls from the belt, thereby assuring that a considerable portion of the heat content of the slag will be recovered.

The air so preheated is withdrawn from the shaft 74 through a conduit 84 by a blower 86. The air is then forced through a conduit 88 into a conduit 90 for mixing with air supplied to the conduit 90 by a blower 92 through a conduit 94, a heater 96 of the flue gas type and a conduit 98. The air thus mixed may serve as combustion air for the firing system of the fluid heating unit.

The slag is withdrawn from the pit 76 through a conduit 100 by a distributor 102, which is similar in arrangement to the distributor of the Fig. 1 apparatus. A portion of the slag is discarded to suitable waste receiving means by way of a conduit 104, the amount so discarded depending on the quantity of molten slag tapped from the furnace 60. The remaining granulated slag is recirculated through a conduit 106 to the hopper 70, for return to the belt 66. The slag to be recycled is preferably cooled only to a medial temperature between that of the air entering the pit 76 and of the molten slag. This may be accomplished by controlling the rate of flow of air entering the pit 76. By so doing the temperature difference causing the exchange of heat between the ascending air and descending slag will be greater and the air temperature can be increased to a higher level.

While in accordance with the provisions of the statutes illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of other features.

What is claimed is:

1. The method of recovering heat from a stream of molten slag formed by the burning of a solid fuel which comprises introducing the stream of molten slag into direct heat transfer relation with a stream of granulated slag so that the molten slag gives up a substantial portion of its latent heat of fusion to the granulated slag, causing the resulting slag mass to break and granulate while passing a stream of air in direct heat transfer relation therewith to absorb a substantial portion of the heat content of the slag, thereby producing a descending temperature gradient in the slag and an ascending temperature gradient in the air stream, and collecting and removing the slag thus cooled.

2. The method of recovering heat from a stream of molten slag formed by the burning of a solid fuel which comprises introducing the stream of molten slag into direct heat transfer relation with a stream of granulated slag so that the molten slag gives up a substantial portion of its latent heat of fusion to the granulated slag, causing the resulting slag mass to break and granulate while passing a stream of air in direct heat transfer relation therewith to absorb a substantial portion of the heat content of the slag, thereby producing a descending temperature gradient in the slag and an ascending temperature gradient in the air stream, collecting and withdrawing the slag thus cooled, and discarding a portion of the slag withdrawn to waste and recycling the remainder for heat exchange with the molten slag.

3. The method of recovering heat from a stream of molten slag formed by the burning of a solid fuel which comprises introducing the stream of molten slag into direct heat transfer relation with a stream of granulated slag so that the molten slag gives up a substantial portion of its latent heat of fusion to the granulated slag, causing the resulting slag mass to break and granulate while passing a stream of air in countercurrent and direct heat transfer relation therewith to complete solidification of the molten slag and to absorb a substantial portion of the sensible heat content of the slag, thereby producing a descending temperature gradient in the slag and an ascending temperature gradient in the air stream, collecting and withdrawing the slag thus cooled, and discarding a portion of the slag withdrawn to waste and recycling the remainder for heat exchange with the molten slag.

4. The method of recovering heat from a stream of molten slag discharging from a furnace fired by a slag-forming fuel which comprises introducing into a slag-contacting zone molten slag and recycled granulated slag in separate streams for direct heat exchange contact therein so that the molten slag gives up a substantial portion of its latent heat of fusion to the granulated slag, causing the resulting slag mass to move through a slag-agitating zone to cause breaking and granulation of the slag mass while passing a stream of air in direct heat transfer relation therewith to absorb a substantial portion of the heat content of the slag, thereby producing a descending temperature gradient in the slag and an ascending temperature gradient in the air stream, collecting the slag thus cooled in a slag-collecting zone, withdrawing the slag so collected from the slag-collecting zone, and discarding an inferior portion of the slag withdrawn to waste and recycling the remainder to the slag-contacting zone for direct heat exchange with the molten slag.

5. The method of recovering heat from a stream of molten slag discharging from a furnace fired by a slag-forming fuel which comprises introducing into a slag-contacting zone molten slag and recycled granulated slag in separate streams for direct heat exchange contact therein so that the molten slag gives up a substantial portion of its latent heat of fusion to the granulated slag, causing the resulting slag mass to move through a slag-agitating zone to cause breaking and granulation of the slag mass while passing a stream of air in countercurrent and direct heat transfer relation therewith to absorb a substantial portion of the heat content of the slag, thereby producing a descending temperature gradient in the slag and an ascending temperature gradient in the air stream, collecting the slag thus cooled in a slag-collecting zone, withdrawing the slag so collected from the slag-collecting zone, and discarding a portion of the slag withdrawn to waste at a rate substantially equivalent to the rate of flow of molten slag and recycling the remainder to the slag-contacting zone for direct heat exchange with the molten slag.

6. The method of recovering heat from a stream of molten slag discharging from a furnace fired by a slag-forming fuel which comprises introducing into a slag-contacting chamber molten slag and recycled granulated slag in separate streams for direct heat exchange contact therein so that the molten slag gives up a substantial portion of its latent heat of fusion to the granulated slag, gravitating the resulting slag mass into the top of an inclined rotating chamber to cause breaking and granulation thereof while passing a stream of air in direct heat transfer relation therewith to absorb a substantial portion of the heat content of the slag, thereby producing a descending temperature gradient in the slag and an ascending temperature gradient in the air stream, collecting the slag thus cooled in a slag-collecting chamber, withdrawing the slag so collected from the slag-collecting chamber, and discarding an inferior portion of the slag withdrawn to waste and recycling the remainder to the slag-contacting chamber for direct heat exchange with the molten slag.

7. The method of recovering heat from a stream of molten slag discharging from a furnace fired by a slag-forming solid fuel which comprises introducing into a slag-contacting chamber molten slag and recycled granulated slag in separate streams for direct heat exchange contact therein so that the molten slag gives up a substantial portion of its latent heat of fusion to the granulated slag, gravitating the resulting slag mass into the top of an inclined rotating chamber to cause breaking and granulation thereof while passing a stream of air in countercurrent and direct heat transfer relation therewith to complete solidification of the molten slag and to absorb a substantial portion of the sensible heat content of the slag, thereby producing a descending temperature gradient in the slag and an ascending temperature gradient in the air stream, collecting the slag thus cooled in a slag-collecting chamber, withdrawing the slag so collected from the slag-collecting chamber, and discarding a portion of the slag withdrawn to waste at a rate substantially equivalent to the rate of flow of molten slag and recycling the remainder to the slag-contacting chamber for direct heat exchange with the molten slag.

8. Apparatus for recovering heat from a stream of molten slag formed by the burning of a solid fuel which comprises means for introducing a stream of molten slag in direct heat transfer relation with a stream of granulated slag so that the molten slag gives up a substantial portion of its latent heat of fusion to the granulated slag, means for causing the resulting slag mass to break and granulate, means for passing a stream of air in direct heat transfer relation with the slag while being broken and granulated to absorb a substantial portion of the heat content of the slag, thereby producing a descending temperature gradient in the slag and an ascending temperature gradient in the air stream, and means for collecting and removing the slag thus cooled.

9. Apparatus for recovering heat from a stream of molten slag discharging from a furnace fired by a slag-forming fuel which comprises means for introducing a stream of molten slag in direct heat transfer relation with a stream of granulated slag so that the molten slag gives up a substantial portion of its latent heat of fusion to the granulated slag, means for causing the resulting slag mass to break and granulate, means for passing a stream of air in countercurrent and direct heat transfer relation with the slag while being broken and granulated to absorb a substantial portion of the sensible heat content of the slag, thereby producing a descending temperature gradient in the slag and an ascending temperature gradient in the air stream, and means for collecting and removing the slag thus cooled.

10. Apparatus for recovering heat from a stream of molten slag discharging from a furnace fired by a slag-forming fuel which comprises means for introducing a stream of molten slag in direct heat transfer relation with a stream of granulated slag so that the molten slag gives up a substantial portion of its latent heat of fusion to the granulated slag, means for causing the resulting slag mass to break and granulate, means for passing a stream of air in direct heat transfer relation with the slag while being broken and granulated to absorb a substantial portion of the heat content of the slag, thereby producing a descending temperature gradient in the slag and an ascending temperature gradient in the air stream, means for collecting and removing the slag thus cooled, and means for discarding a portion of the slag removed to waste and recycling the remainder for direct heat exchange with the molten slag.

11. Apparatus for recovering heat from a stream of molten slag formed by the burning of a solid fuel which comprises means defining a slag-contacting chamber, means for introducing into said slag-contacting chamber a stream of molten slag in direct heat transfer relation with a stream of granulated slag so that the molten slag gives up a substantial portion of its latent heat of fusion to the granulated slag, an inclined rotating chamber arranged to receive the resulting slag mass discharging from said slag outlet and to break and granulate the slag while moving therethrough, means for passing a stream of air in direct heat transfer relation with the slag moving through said rotating chamber to absorb a substantial portion of the heat content of the slag, thereby producing a descending temperature gradient in the slag and an ascending temperature gradient in the air stream, means for collecting the slag thus cooled discharging from said rotating chamber, means for removing the slag so collected, and means for discarding a portion of the slag removed to waste and recycling the remainder to the slag-contacting chamber for direct heat exchange wtih the molten slag.

12. Apparatus for recovering heat from a stream of molten slag formed by the burning of a solid fuel which comprises means defining a slag-contacting chamber, means for introducing into said slag-contacting chamber a stream of molten slag in direct heat transfer relation with a stream of granulated slag so that the molten slag gives up a substantial portion of its latent heat of fusion to the granulated slag, an inclined rotating chamber of circular cross-section arranged to receive the resulting slag mass discharging from said slag outlet and to break and granulate the slag while moving therethrough, means for passing a stream of air in countercurrent and direct heat transfer relation with the slag moving through said rotating chamber to absorb a substantial portion of the sensible heat content of the slag, thereby producing a descending temperature gradient in the slag and an ascending temperature gradient in the air stream, means for collecting the slag thus cooled discharging from said rotating chamber, means for removing the slag so collected, and means for discarding and recycling the remainder to the slag-contacting chamber for direct heat exchange with the molten slag.

13. Apparatus for recovering heat from a stream of molten slag discharging from a furnace fired by a slag-forming fuel which comprises means defining a slag-contacting chamber including an inclined floor portion and having a slag outlet at one end thereof, means for introducing onto the inclined floor of said slag-contacting chamber a slag mass comprising a stream of molten slag between and in direct heat transfer relation with streams of granulated slag so that the molten slag gives up a substantial portion of its latent heat of fusion to the streams of granulated slag, an inclined rotating chamber of circular cross-section arranged to receive the resulting slag mass discharging from said slag outlet and to break and granulate the slag while moving therethrough, means for passing a stream of air in countercurrent and direct heat transfer relation with the slag moving through said rotating chamber to complete solidification of the molten slag and to absorb a substantial portion of the sensible heat content of the slag, thereby producing a descending temperature gradient in the slag and an ascending temperature gradient in the air stream, means for collecting the slag thus cooled discharging from said rotating chamber, means for removing the slag so collected, and means for discarding a portion of the slag removed to waste at a rate substantially equivalent to the rate of flow of molten slag and recycling the remainder to the slag-contacting chamber for direct heat exchange with the molten slag.

14. Apparatus for recovering heat from a stream of molten slag discharging from a furnace fired by a slag-forming solid fuel which comprises means defining a slag-contacting chamber, a horizontally elongated rotating belt arranged within said slag-contacting chamber, means for introducing onto said belt a stream of molten slag in direct heat transfer relation with a stream of granulated slag so that the molten slag gives up a substantial portion of its latent heat of fusion to the granulated slag, a slag-collecting chamber arranged to receive the slag discharging from said belt, means for passing a stream of air in countercurrent and direct heat transfer relation with the slag depositing in said slag-collecting chamber and discharging from said belt to complete solidification of the molten slag and to absorb a substantial portion of the sensible heat content of the slag, thereby producing a descending temperature gradient in the slag and an ascending temperature gradient in the air stream, means for removing the slag so collected, and means for discarding a portion of the slag removed to waste at a rate substantially equivalent to the rate of flow of molten slag and recycling the remainder to the slag-contacting chamber for direct heat exchange with the molten slag.

References Cited in the file of this patent

UNITED STATES PATENTS

| | | |
|---|---|---|
| 818,541 | Lang | Apr. 24, 1906 |
| 1,115,321 | Lessing | Oct. 27, 1914 |
| 2,044,680 | Gilbert | June 16, 1936 |
| 2,464,187 | Seaton | Mar. 8, 1949 |
| 2,484,792 | Mollring | Oct. 11, 1949 |
| 2,562,149 | Mollring | July 24, 1951 |

FOREIGN PATENTS

| | | |
|---|---|---|
| 389,239 | Germany | Feb. 2, 1924 |